United States Patent
Yang et al.

(10) Patent No.: US 10,951,533 B2
(45) Date of Patent: Mar. 16, 2021

(54) HEADER FORMATS IN WIRELESS COMMUNICATION

(71) Applicant: QUALCOMM Incorporated, San Diego, CA (US)

(72) Inventors: Yue Yang, San Diego, CA (US); Shailesh Maheshwari, San Diego, CA (US); Aziz Gholmieh, Del Mar, CA (US); Srinivasan Balasubramanian, San Diego, CA (US); Xing Chen, San Diego, CA (US); Arnaud Meylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/105,885

(22) Filed: Aug. 20, 2018

(65) Prior Publication Data

US 2019/0097936 A1 Mar. 28, 2019

Related U.S. Application Data

(60) Provisional application No. 62/564,113, filed on Sep. 27, 2017.

(51) Int. Cl.
| | |
|---|---|
| *H04L 12/851* | (2013.01) |
| *H04L 29/08* | (2006.01) |
| *H04L 29/06* | (2006.01) |
| *H04W 72/04* | (2009.01) |
| *H04W 28/02* | (2009.01) |
| *H04W 12/00* | (2009.01) |

(Continued)

(52) U.S. Cl.
CPC .............. *H04L 47/24* (2013.01); *H04L 69/22* (2013.01); *H04L 69/324* (2013.01); *H04W 12/0013* (2019.01); *H04W 28/0263* (2013.01); *H04W 28/0268* (2013.01); *H04W 72/04* (2013.01); *H04W 28/24* (2013.01); *H04W 72/10* (2013.01)

(58) Field of Classification Search
CPC . H04W 80/02; H04W 28/0268; H04W 28/24; H04W 80/08; H04W 76/10; H04W 28/06; H04L 69/22; H04L 47/24; H04L 5/001
See application file for complete search history.

(56) References Cited

U.S. PATENT DOCUMENTS

| | | | |
|---|---|---|---|
| 6,785,236 B1* | 8/2004 | Lo ..................... | H04L 29/06027 370/235 |
| 2004/0120317 A1* | 6/2004 | Forssell ................. | H04L 47/14 370/394 |

(Continued)

FOREIGN PATENT DOCUMENTS

KR 10-2016-0146353 * 5/2018 ............ H04W 28/06

OTHER PUBLICATIONS

Translation of KR 10-2016-0146353, 2016 (Year: 2016).*

(Continued)

*Primary Examiner* — Christopher M Crutchfield
(74) *Attorney, Agent, or Firm* — Loza & Loza, LLP

(57) ABSTRACT

Aspects of the present disclosure relate to methods and apparatuses for wireless communication using a protocol data unit (PDU) including a service data adaptation protocol (SDAP) PDU that has an unciphered header. The unciphered SDAP header facilitates various optimizations in wireless communication.

13 Claims, 12 Drawing Sheets

(51) Int. Cl.
*H04W 72/10* (2009.01)
*H04W 28/24* (2009.01)

(56) References Cited

U.S. PATENT DOCUMENTS

| | | | |
|---|---|---|---|
| 2009/0109844 A1* | 4/2009 | Lee | H04L 47/14 370/230 |
| 2010/0157904 A1 | 6/2010 | Ho et al. | |
| 2018/0146398 A1* | 5/2018 | Kim | H04W 72/0406 |
| 2018/0270791 A1* | 9/2018 | Park | H04W 68/04 |
| 2019/0029057 A1* | 1/2019 | Pan | H04W 28/12 |

OTHER PUBLICATIONS

Author Unknown, SDAP Header Format, Doc. No. R2-1707159, pp. 1-4, Jun. 29, 2017 (Year: 2017).*
Author Unknown, QoS framework for NR, R1-1700842, pp. 1-4, Feb. 17, 2017 (Year: 2017).*
Author Unknown, SDAP Header Format, R2-1706782, pp. 1-5, Jun. 29, 2017 (Year: 2017).*
"3rd Generation Partnership Project; Technical Specification Group Radio Access Network; E-UTRA and NR; Service Data Adaptation Protocol (SOAP) specification (Release 15)", 3GPP Standard; Technical Specification; 3GPP TS 37.324, 3rd Generation Partnership Project (3GPP), Mobile Competence Centre : 650, Route Des Lucioles ; F-06921 Sophia-Antipolis Cedex ; France, vol. RAN WG2, No. v0.1.0, Jul. 25, 2017, pp. 1-14, XP051336682, [retrieved on Jul. 25, 2017].
"3rd Generation Partnership Project; Technical Specification Group Radio Access Network; NG Radio Access Network; Overall Description; Stage 2 (Release 15)", 3GPP Draft; R2-1702627 TS 38300 V010, 3rd Generation Partnership Project (3GPP), Mobile Competence Centre : 650, Route Des Lucioles ; F-06921 Sophia-Antipolis Cedex ; France, Apr. 3, 2017, XP051244629, Retrieved from the Internet: URL:http://www.3gpp.org/ftp/Meetings_3GPP_SYNC/RAN2/Docs/ [retrieved on Apr. 3, 2017], 28 pages.
CATT: "Discussion on QoS Mapping", 3GPP Draft; R2-1704250, 3rd Generation Partnership Project (3GPP), Mobile Competence Centre, 650, Route Des Lucioles, F-06921 Sophia-Antipolis Cedex, France, vol. RAN WG2, No. Hangzhou, China; May 15, 2017-May 19, 2017 May 14, 2017, XP051274828, Retrieved from the Internet: URL:http://www.3gpp.org/ftp/Meetings_3GPP_SYNC/RAN2/Docs/ [retrieved on May 14, 2017], 2 pages.
International Search Report and Written Opinion—PCT/US2018/047378—ISA/EPO—dated Nov. 20, 2018.
Nokia et al., "SDAP header", 3GPP Draft; R2-1702644 SDAP Header, 3rd Generation Partnership Project (3GPP), Mobile Competence Centre, 650, Route Des Lucioles, F-06921 Sophia-Antipolis Cedex, France, vol. RAN WG2, No. Spokane, USA; Apr. 3, 2017-Apr. 7, 2017 Apr. 3, 2017, XP051244646, Retrieved from the Internet: URL:http://www.3gpp.org/ftp/Meetings_3GPP_SYNC/RAN2/Docs/ [retrieved on Apr. 3, 2017], 2 pages.
Qualcomm Incorporated: "SDAP Header Excluded from PDCP Ciphering", 3GPP Draft; R2-1710906, 3rd Generation Partnership Project (3GPP), Mobile Competence Centre, 650, Route Des Lucioles, F-06921 Sophia-Antipolis Cedex, France, vol. RAN WG2, No. Prague, Czech Republic; Oct. 9, 2017-Oct. 13, 2017 Oct. 8, 2017, XP051342919, Retrieved from the Internet:URL:http://www.3gpp.org/ftp/Meetings_3GPP_SYNC/RAN2/Docs/ [retrieved on Oct. 8, 2017], 2 pages.
Qualcomm Incorporated: "SDAP Header Hardware Implications", 3GPP Draft; R2-1713727, 3rd Generation Partnership Project (3GPP), Mobile Competence Centre, 650, Route Des Lucioles, F-06921 Sophia-Antipolis Cedex, France, vol. RAN WG2, No. Reno, USA; Nov. 27, 2017-Dec. 1, 2017 Nov. 17, 2017, XP051372385, Retrieved from the Internet: URL:http://www.3gpp.org/ftp/tsg%5Fran/WG2%5FRL2/TSGR2%5F100/Docs/ [retrieved on Nov. 17, 2017], 2 pages.
Ericsson: "Removing UL Channel Interleaver for 1 ms TTI", 3GPP TSG-RAN WG1 Meeting #90bis, R1-1717159, Prague, Czech Republic, Oct. 9-13, 2017, 5 Pages.

* cited by examiner

HEADER FORMATS IN WIRELESS COMMUNICATION

PRIORITY CLAIM

This application claims priority to and the benefit of U.S. provisional patent application No. 62/564,113 filed in the United States Patent and Trademark Office on Sep. 27, 2017, the entire content of which is incorporated herein by reference as if fully set forth below in its entirety and for all applicable purposes.

TECHNICAL FIELD

The technology discussed below relates generally to wireless communication systems, and more particularly, to a network protocol stack and header formats for wireless communication.

INTRODUCTION

In wireless communication, a device may process data for transmission through a network protocol stack including multiple protocol layers. For example, the protocol stack may include a packet data convergence protocol (PDCP) layer, a radio link control (RLC) layer, a media access control (MAC) layer, and a physical (PHY) layer. The MAC layer may select the modulation and coding scheme (MCS) that configures the PHY layer. A service data unit (SDU) is a term used to refer to a unit of data that is passed down from an upper protocol layer to a lower protocol layer. For example, the MAC layer receives one or more SDUs from the RLC layer. Then the MAC layer encapsulates the SDU(s) into a MAC protocol data unit (PDU). For example, a MAC PDU may include a MAC header and one or more upper layer SDU(s). Similar encapsulation may be performed at other protocol layers. In some network implementations, the header of one or more layers may be ciphered to encrypt the data. As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One aspect of the present disclosure provides a method of wireless communication at a transmitting device. The transmitting device receives one or more quality of service (QoS) flows from a protocol layer. A QoS flow may be an Internet Protocol (IP) flow that is identified to receive a quality of service treatment by the system. The transmitting device maps the one or more QoS flows to one or more data radio bearers (DRBs) established between the transmitting device and a receiving device. The transmitting device transmits a plurality of media access control (MAC) protocol data units (PDUs) corresponding to the one or more DRBs or QoS flows. Each MAC PDU includes a packet data convergence protocol (PDCP) PDU that includes a PDCP header and a partially ciphered PDCP payload. In one example, the partially ciphered PDCP payload includes a service data adaptation protocol (SDAP) header that is not ciphered.

Another aspect of the present disclosure provides a method of wireless communication at a receiving device. The receiving device receives a MAC PDU including a PDCP PDU that includes a PDCP header and a partially ciphered PDCP payload. The receiving device extracts an SDAP PDU corresponding to one or more QoS flows, from the partially ciphered PDCP payload. The receiving device reads an SDAP header of the SDAP PDU to obtain information on the one or more QoS flows prior to deciphering an SDAP payload of the SDAP PDU.

Another aspect of the present disclosure provides an apparatus for wireless communication. The apparatus includes a memory storing executable code, a transceiver configured for wireless communication, and a processor communicatively coupled with the memory and the transceiver. The processor and the memory are configured to receive one or more QoS flows from a protocol layer. The processor and the memory are further configured to map the one or more QoS flows to one or more DRBs established between the apparatus and a receiving device. The processor and the memory are further configured to transmit a plurality of MAC PDUs corresponding to the one or more DRBs. Each MAC PDU includes a PDCP PDU including a PDCP header and a partially ciphered PDCP payload. In one example, the partially ciphered PDCP payload includes an SDAP header that is not ciphered.

Another aspect of the present disclosure provides an apparatus for wireless communication. The apparatus includes a memory storing executable code, a transceiver configured for wireless communication, and a processor communicatively coupled with the memory and the transceiver. The processor and the memory are configured to receive a MAC PDU that includes a PDCP PDU including a PDCP header and a partially ciphered PDCP payload. The processor and the memory are further configured to extract an SDAP PDU corresponding to one or more QoS flows from the partially ciphered PDCP payload. The processor and the memory are further configured to read an SDAP header of the SDAP PDU to obtain information on the one or more QoS flows prior to deciphering an SDAP payload of the SDAP PDU.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Aspects of the present disclosure provide a data packet format that may facilitate certain optimizations in wireless communication using a layered protocol stack. Some examples of such optimizations include data prioritization during transmission and packet pre-processing during reception.

Figure 1:
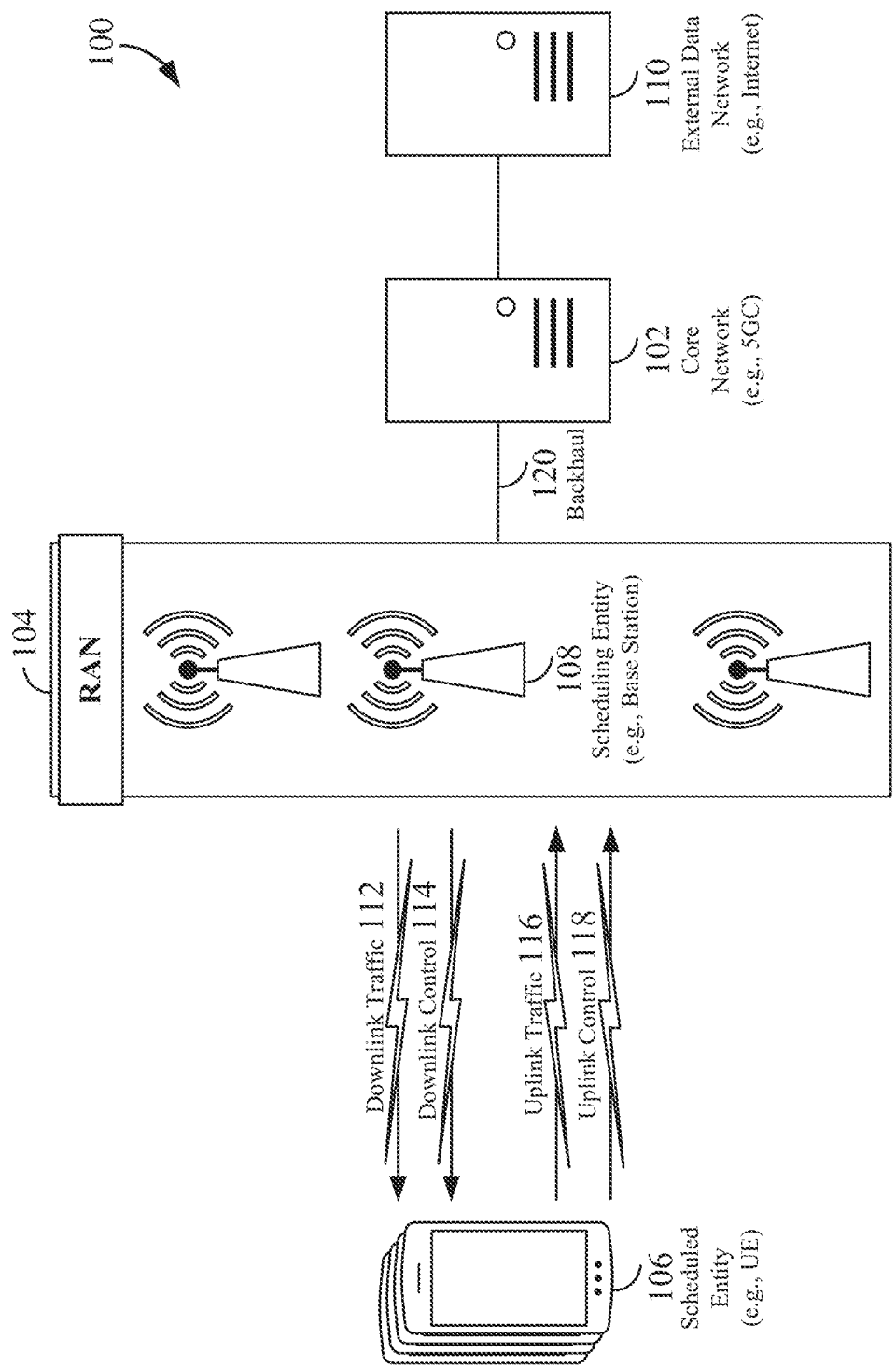
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant quality of service (QoS) for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
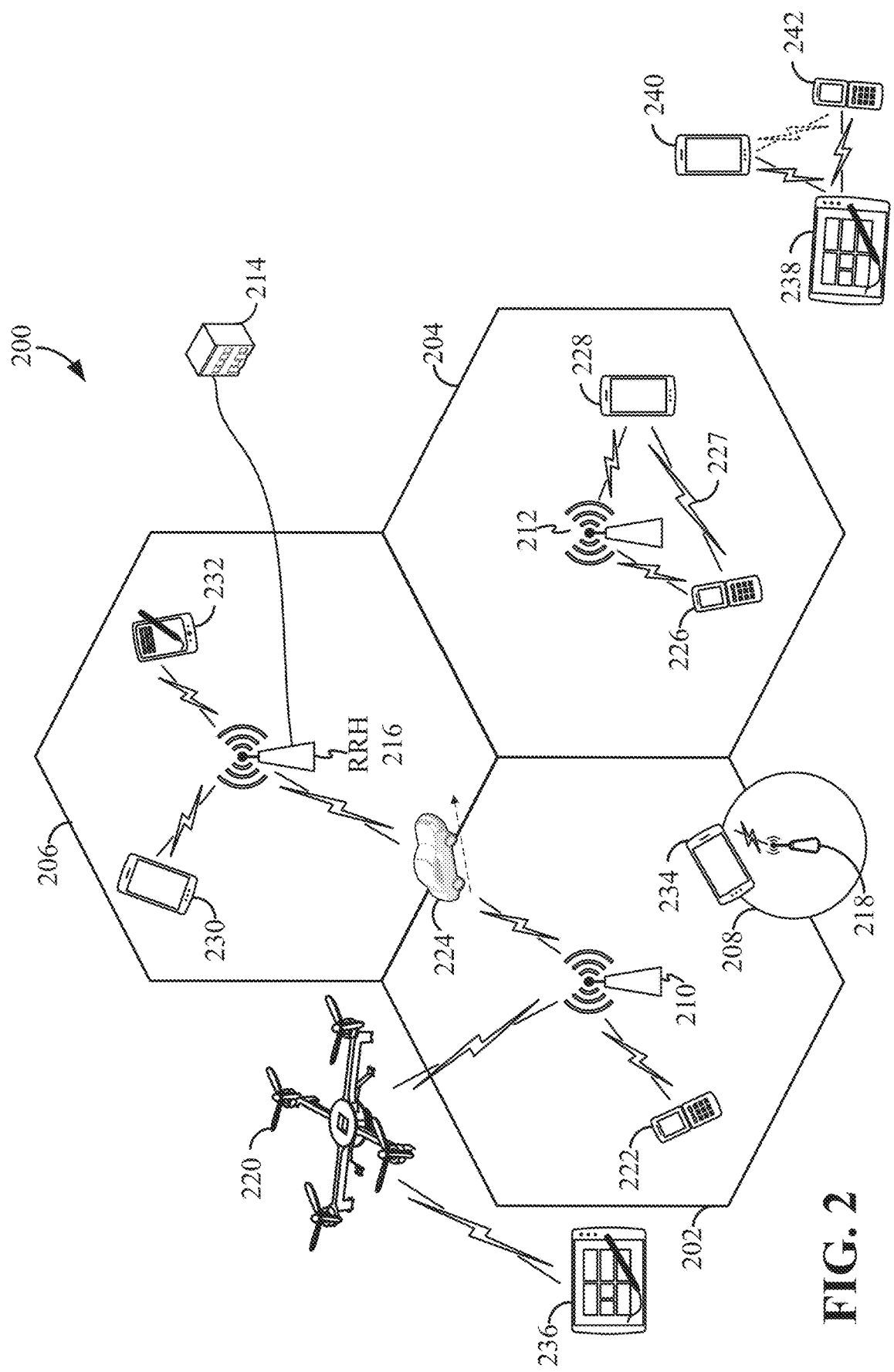
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Within the present disclosure, a frame may refer to a duration of a predetermined duration (e.g., 10 ms) for wireless transmissions, with each frame consisting of a predetermined number of subframes (e.g., 10 subframes of 1 ms each). On a given carrier, there may be one set of frames in the UL, and another set of frames in the DL. Each subframe may consist of one or multiple adjacent slots. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs. An exemplary slot may include a control region and a data region. In general, the control region may carry control channels, and the data region may carry data channels. Of course, a slot may contain all DL, all UL, or at least one DL portion and at least one UL portion. In some aspects of the disclosure, different slot structures may be utilized, and may include one or more of each of the control region(s) and data region(s).

In a DL transmission, the transmitting device (e.g., the scheduling entity 108) may allocate one or more resource elements (REs) (e.g., time-frequency resources within a control region) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs (e.g., within the data region) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs within the data region may be configured to carry system information blocks (SIBs), carrying information that may enable access to a given cell.

The channels or carriers described above and illustrated in FIG. 1 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 3:
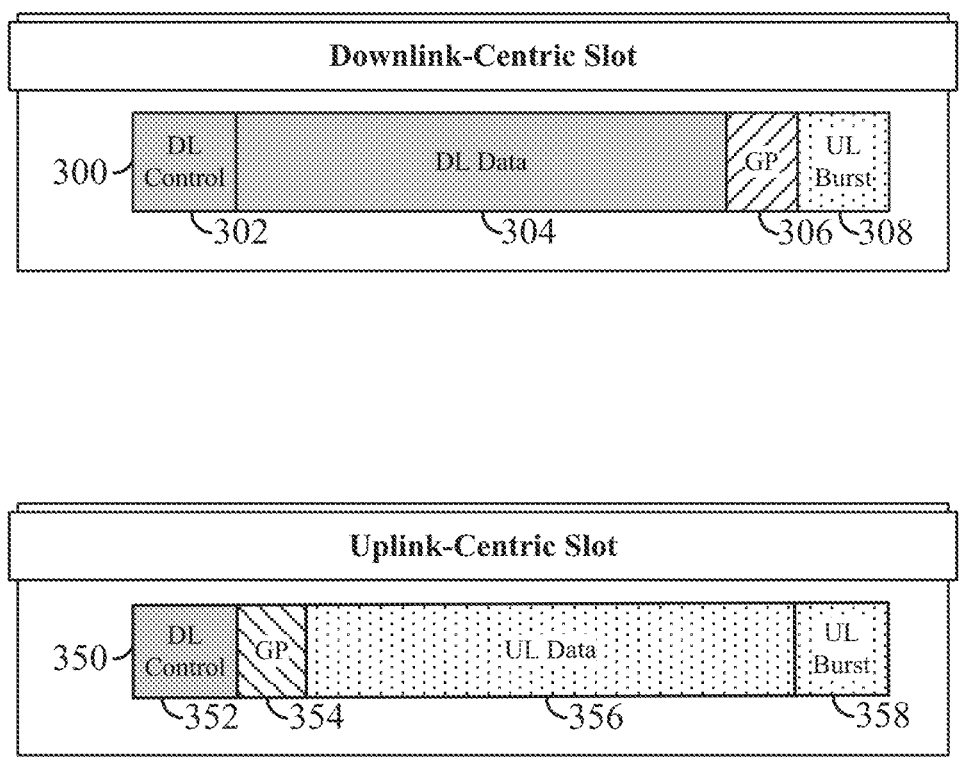
FIG. 3 is a schematic illustration of exemplary self-contained slots according to some aspects of the disclosure.

According to an aspect of the disclosure, one or more slots may be structured as self-contained slots. For example, FIG. 3 illustrates two example structures of self-contained slots 300 and 350. The self-contained slots 300 and/or 350 may be used, in some examples, in wireless communication between a scheduling entity 108 and a scheduled entity 106.

In the illustrated example, a DL-centric slot 300 may be a transmitter-scheduled slot. The nomenclature DL-centric generally refers to a structure wherein more resources are allocated for transmissions in the DL direction (e.g., transmissions from the scheduling entity 108 to the scheduled entity 106). Similarly, an UL-centric slot 350 may be a receiver-scheduled slot, wherein more resources are allocated for transmissions in the UL direction (e.g., transmissions from the scheduled entity 106 to the scheduling entity 108).

Each slot, such as the self-contained slots 300 and 350, may include transmit (Tx) and receive (Rx) portions. For example, in the DL-centric slot 300, the scheduling entity 108 first has an opportunity to transmit control information, e.g., on a PDCCH, in a DL control region 302, and then an opportunity to transmit DL user data or traffic, e.g., on a PDSCH in a DL data region 304. Following a guard period (GP) region 306 having a suitable duration 310, the scheduling entity 108 has an opportunity to receive UL data and/or UL feedback including any UL scheduling requests, CSF, a HARQ ACK/NACK, etc., in an UL burst 308 from other entities using the carrier. Here, a slot such as the DL-centric slot 300 may be referred to as a self-contained slot when all of the data carried in the data region 304 is scheduled in the control region 302 of the same slot; and further, when all of the data carried in the data region 304 is acknowledged (or at least has an opportunity to be acknowledged) in the UL burst 308 of the same slot. In this way, each self-contained slot may be considered a self-contained entity, not necessarily requiring any other slot to complete a scheduling-transmission-acknowledgment cycle for any given packet.

The GP region 306 may be included to accommodate variability in UL and DL timing. For example, latencies due to radio frequency (RF) antenna direction switching (e.g., from DL to UL) and transmission path latencies may cause the scheduled entity 106 to transmit early on the UL to match DL timing. Such early transmission may interfere with symbols received from the scheduling entity 108. Accordingly, the GP region 306 may allow an amount of time after the DL data region 304 to prevent interference, where the GP region 306 provides an appropriate amount of time for the scheduling entity 108 to switch its RF antenna direction, an appropriate amount of time for the over-the-air (OTA) transmission, and an appropriate amount of time for ACK processing by the scheduled entity.

Similarly, the UL-centric slot 350 may be configured as a self-contained slot. The UL-centric slot 350 is substantially similar to the DL-centric slot 300, including a guard period 354, an UL data region 356, and an UL burst region 358.

The slot structure illustrated in slots 300 and 350 is merely one example of self-contained slots. Other examples may include a common DL portion at the beginning of every slot, and a common UL portion at the end of every slot, with various differences in the structure of the slot between these respective portions. Other examples still may be provided within the scope of the present disclosure.

Figure 4:
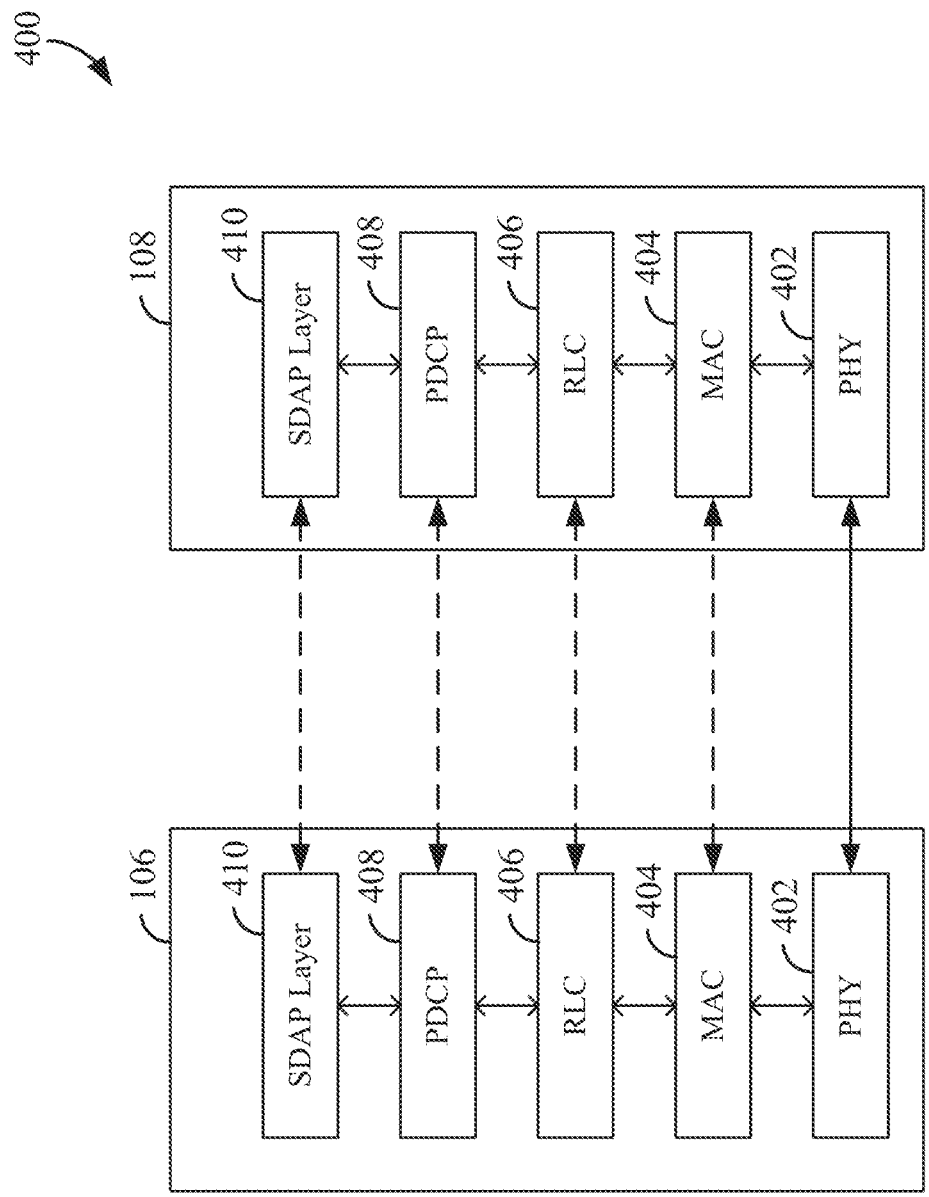
FIG. 4 is a diagram illustrating a user plane protocol stack for wireless communication according to some aspects of the disclosure.

FIG. 4 is a diagram illustrating a user plane protocol stack 400 for wireless communication according to some aspects of the disclosure. In some examples, this protocol stack 400 may be used in a 5G New Radio (NR) network between a scheduling entity 108 (e.g., gNB) and a scheduled entity 106 (e.g., UE). In some examples, the protocol stack 400 may be used between other devices. The protocol stack 400 includes a PHY layer 402 that implements various physical layer communication functions. Other protocol layers are a media access control (MAC) layer 404, a radio link control (RLC) layer 406, a packet data convergence protocol (PDCP) layer 408, and a service data adaptation protocol (SDAP) layer 410. The services and functions of the SDAP layer 410 may include mapping between a QoS flow and a data radio bearer, and marking QoS flow ID (QFI) in both DL and UL packets. A QoS flow is one or more Internet Protocol (IP)

flows that are identified to receive a quality of service treatment by the system. In one example, an IP flow may be IP traffic from one endpoint to another endpoint, and it can be identified by the source and destination IP addresses and ports as well as the transport protocol (UDP or TCP). A single protocol entity of SDAP may be configured for each individual PDU session. The PDCP layer 408 provides various functions including ciphering and deciphering of data. Upstream of the SDAP layer 410 may be one or more upper layers, for example, an IP layer, and/or an application layer. Each protocol layer at the scheduling entity 108 communicates with a corresponding peer protocol layer at the scheduled entity 106. In some examples, one or more of the protocol layers may not be used in a network entity.

Figure 5:
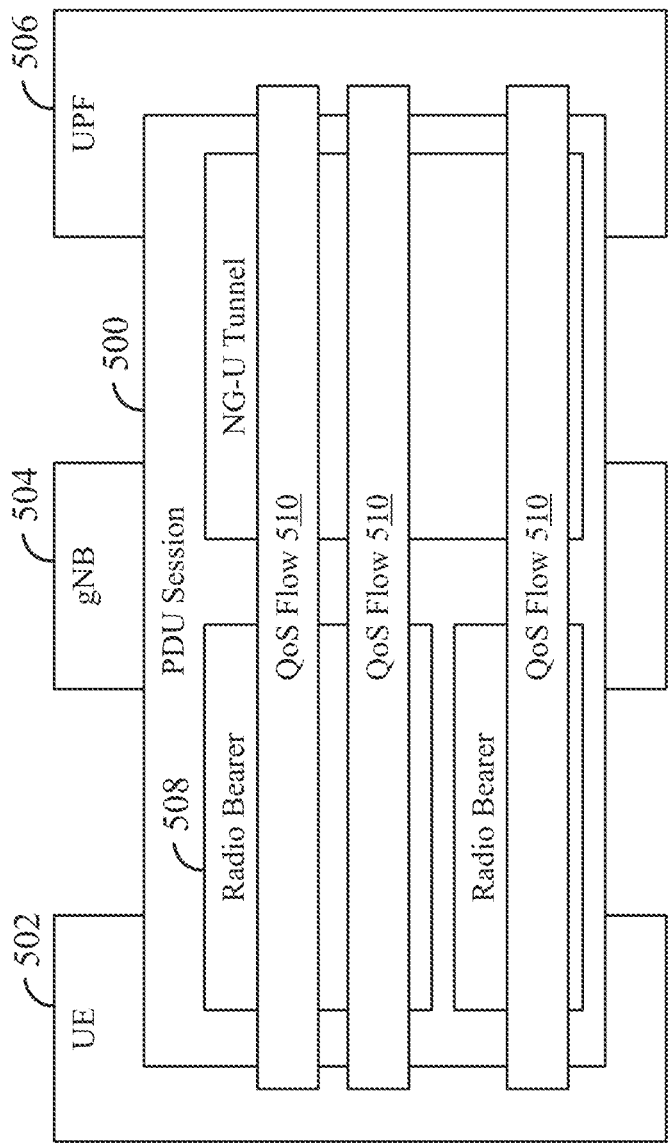
FIG. 5 is a diagram illustrating a PDU session established between a UE, a gNB, and a user plane function (UPF) according to some aspects of the disclosure.

FIG. 5 is a diagram illustrating a PDU session established between a UE 502, a gNB 504, and a user plane function (UPF) 506 according to some aspects of the disclosure. In some examples, the UE 502 may be any of the UEs or scheduled entities illustrated in FIGS. 1, 2 and 4, and the gNB 504 may be any of the base stations or scheduling entities illustrated in FIGS. 1, 2, and 4. In a 5G NR network, the core network may consist of various network functions (NFs). One of the NFs is a UPF 506 that connects the gNB 504 to a data network that provides Internet access or operator services. The UPF supports features and capabilities to facilitate user plane operation, for example, packet routing and forwarding, interconnection to the data network, policy enforcement, and data buffering. In one example, the UPF 506 may reside in the core network 102. In some examples, more than one PDU session may be established for the UE 502. The UE 502 receives services through the PDU session, which is a logical connection between the UE and network. For each UE (e.g., scheduled entity 106), the network establishes one or more data radio bearers (DRBs) 508 between the UE 502 and the gNB 504 per PDU session, and maps data packets to different DRBs. IP flows of the upper layer are mapped to quality of service (QoS) flows 510, then the QoS flows are mapped to the DRBs 508.

The SDAP layer 410 (see FIG. 4) may handle some of the mapping functions for the PDU session. For example, in the downlink, the SDAP layer 410 receives one or more QoS flows 510 from the upper layer (e.g., an IP layer) and maps each QoS flow to a corresponding DRB 508. In some examples, the QoS flows 510 may have different priority. The network ensures quality of service (e.g., reliability, latency, and target delay) by mapping packets to appropriate QoS flows and DRBs. For example, latency-sensitive packets may be mapped to a QoS flow with higher priority, while latency-insensitive packets may be mapped to a QoS flow with lower priority. In the uplink, the SDAP layer 410 may provide reflective mapping. For example, the network may decide on the QoS for the DL traffic, and the UE reflects or mirror the DL QoS to the associated UL traffic. That is, the DL and UL may have the same QoS. The SDAP layer 410 marks data packets of each QoS flow with a QoS Flow ID (e.g., QFI) in both DL and UL packets. For each DRB, the UE monitors the QFI(s) of the downlink packets and may apply the same mapping in the uplink. That is, for a DRB, the UE maps the UL packets of concerned IP flow(s) to the QoS flow(s) corresponding to the QoS flow ID(s) observed in the downlink IP flows for that DRB in the UL.

Figure 6:
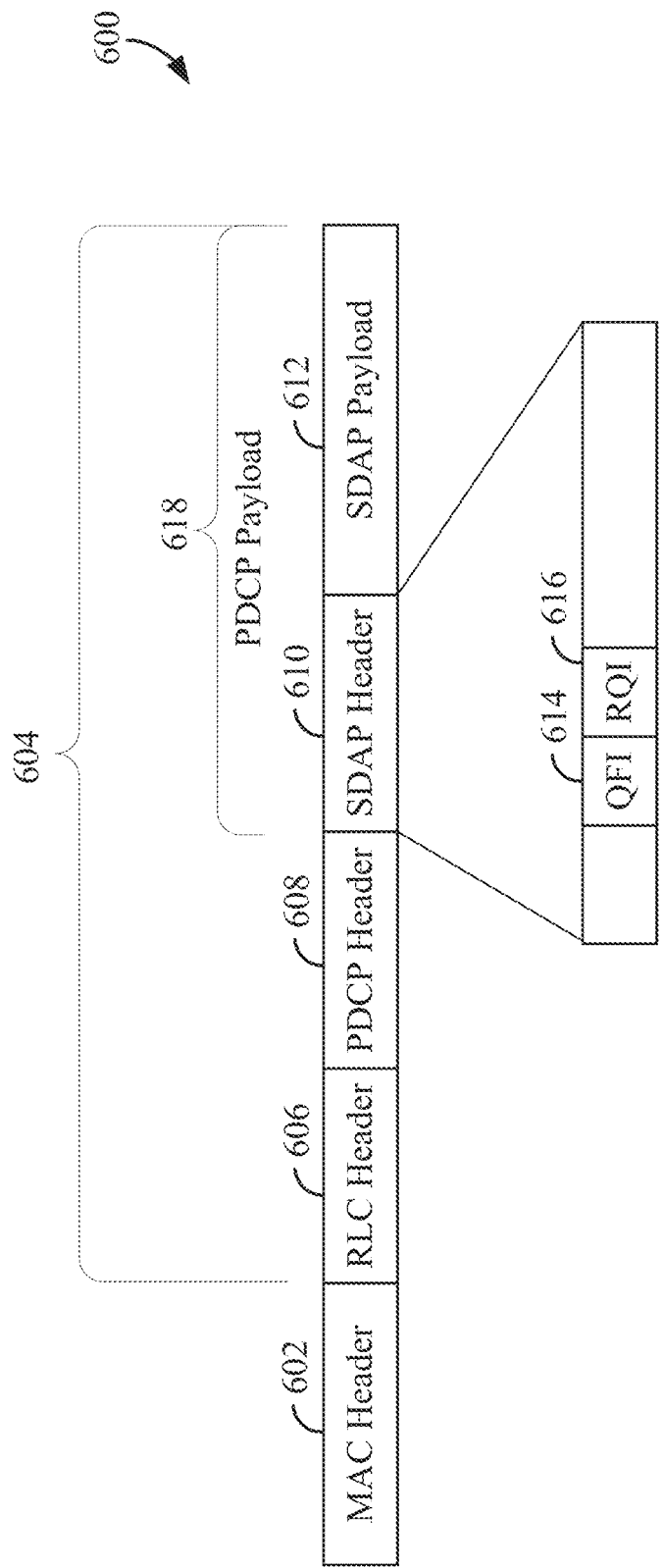
FIG. 6 is a diagram illustrating an exemplary MAC protocol data unit (PDU) according to some aspects of the disclosure.

FIG. 6 is a diagram illustrating an exemplary MAC protocol data unit (PDU) 600 according to some aspects of the disclosure. The MAC PDU 600 may be used for wireless communication, for example, in the wireless communication system 100. The MAC PDU 600 includes various fields, for example, a MAC header 602 and a MAC payload 604. The MAC payload 604 may include various data from the upper network layers, for example, an RLC header 606, a PDCP header 608, an SDAP header 610, and an SDAP payload 612. FIG. 6 merely illustrates the various data fields of one example of the MAC PDU 600 conceptually, and the data fields may carry any number of bits in various designs. In other examples, the MAC PDU 600 may have more or fewer data fields, some of which may not be shown in FIG. 6.

In some examples, the SDAP header 610 may include information on a QFI 614 and a reflective QoS indicator (RQI) 616. The RQI may be set to a certain value (e.g., 0 or 1) to indicate that some or all traffic carried on this QoS flow is subject to reflective mapping. In other examples, the SDAP header 610 may have other data fields not shown in FIG. 6. In some examples, the QFI and RQI may be at locations of the SDAP header 610 different from those shown in FIG. 6.

In some aspects of the disclosure, one or more of the data fields of the MAC PDU 600 may be ciphered at the transmitting device and deciphered at the receiving device. For example, some systems or devices may consider all data fields following the PDCP header 608 (e.g., SDAP header 610 and SDAP payload 612) to be a PDCP payload 618, and accordingly those systems or devices may cipher and decipher those data fields of the PDCP payload together. In that case, the SDAP header 610 is ciphered and deciphered together with the SDAP payload. In one example, the SDAP payload may be an IP payload. However, ciphering/deciphering the SDAP header may preclude some potential optimization implementations that may be used in a NR network.

In some aspects of the disclosure, the SDAP header 610 may not be ciphered ("unciphered"), while the SDAP payload (e.g., IP payload) is ciphered when the SDAP header 610 is included in the MAC PDU 600. Using an unciphered SDAP header enables certain optimizations in UL and DL communication, as described further below.

Figure 7:
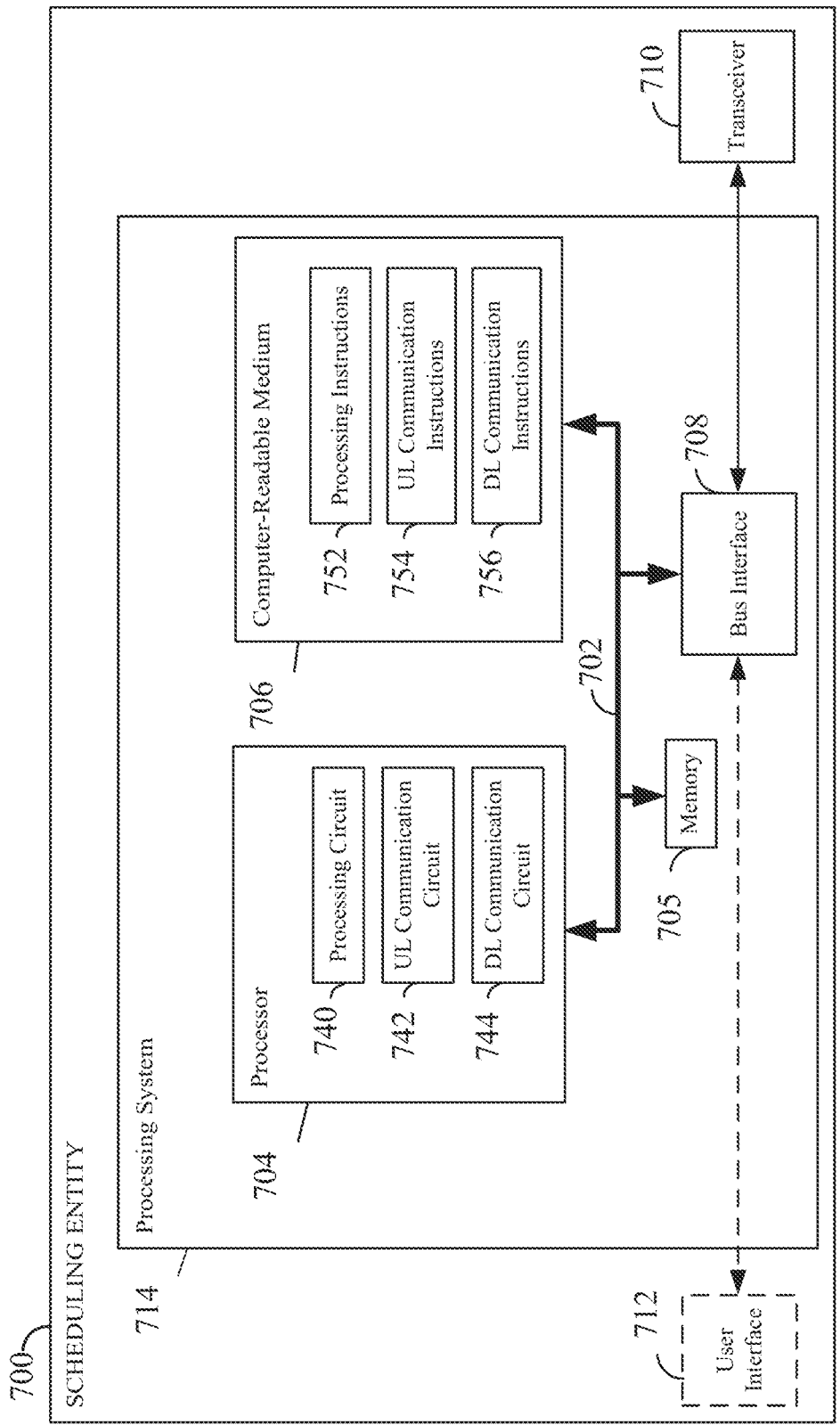
FIG. 7 is a block diagram conceptually illustrating an example of a hardware implementation for a scheduling entity according to some aspects of the disclosure.

FIG. 7 is a block diagram illustrating an example of a hardware implementation for a scheduling entity 700 employing a processing system 714. For example, the scheduling entity 700 may be a user equipment (UE) as illustrated in any one or more of FIGS. 1, 2, and/or 4. In another example, the scheduling entity 700 may be a base station as illustrated in any one or more of FIGS. 1, 2, and/or 4.

The scheduling entity 700 may be implemented with a processing system 714 that includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 700 may be configured to perform any one or more of the functions described herein. That is, the processor 704, as utilized in a scheduling entity 700, may be used to implement any one or more of the processes and procedures described below and illustrated in FIGS. 9-12.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a communication interface or means for communicating with various other apparatus over a transmission medium. Depending upon the nature of the apparatus, a user interface 712 (e.g., keypad, display, speaker, microphone, joystick) may also be provided. Of course, such a user interface 712 is optional, and may be omitted in some examples, such as a base station.

In some aspects of the disclosure, the processor 704 may include circuitry configured for various functions, including, for example, a processing circuit 740, a UL communication circuit 742, and a DL communication circuit 744. The processing circuit 740 may be configured to perform various data processing functions and communication resources allocation and scheduling. In one example, the processing circuit 740 may be configured to implement various protocol entities including a PHY entity, a MAC entity, an RLC entity, a PDCP entity, and an SDAP entity. The UL communication circuit 742 may be configured to perform various UL communication functions, for example, decoding, deciphering, demultiplexing, and receiving. The DL communication circuit 744 may be configured to perform various DL communication functions, for example, encoding, ciphering, multiplexing, and transmitting. For example, the circuitry may be configured to implement one or more of the functions described below in relation to FIGS. 9-12.

The processor 704 is responsible for managing the bus 702 and general processing, including the execution of software stored on the computer-readable medium 706. The software, when executed by the processor 704, causes the processing system 714 to perform the various functions described below for any particular apparatus. The computer-readable medium 706 and the memory 705 may also be used for storing data that is manipulated by the processor 704 when executing software.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 706. The computer-readable medium 706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 706 may reside in the processing system 714, external to the processing system 714, or distributed across multiple entities including the processing system 714. The computer-readable medium 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 706 may include software configured for various functions, including, for example, processing instructions 752, UL communication instructions 754, and DL communication instructions 756. The processing instructions 752 may perform various data processing functions and communication resources allocation and scheduling. The UL communication instructions 754 may perform various UL communication functions, for example, decoding, deciphering, demultiplexing, and receiving. The DL communication instructions 756 may be configured to perform various DL communication functions, for example, encoding, ciphering, multiplexing, and transmitting. For example, the software may be configured to implement one or more of the functions described in relation to FIGS. 9-12.

Figure 8:
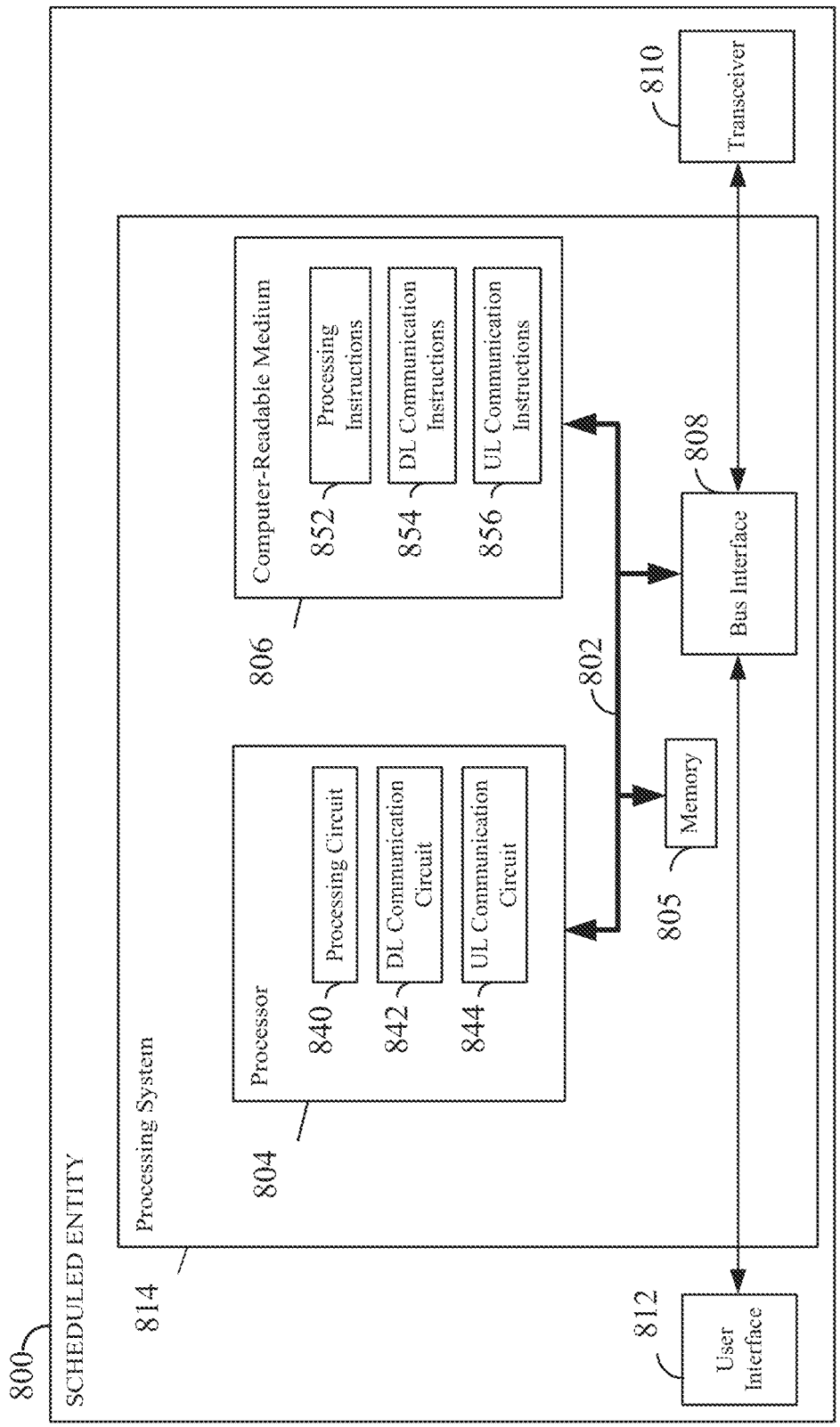
FIG. 8 is a block diagram conceptually illustrating an example of a hardware implementation for a scheduled entity according to some aspects of the disclosure.

FIG. 8 is a conceptual diagram illustrating an example of a hardware implementation for an exemplary scheduled entity 800 employing a processing system 814. In accordance with various aspects of the disclosure, an element, or any portion of an element, or any combination of elements may be implemented with a processing system 814 that includes one or more processors 804. For example, the scheduled entity 800 may be a user equipment (UE) as illustrated in any one or more of FIGS. 1, 2, and/or 4.

The processing system 814 may be substantially the same as the processing system 714 illustrated in FIG. 7, including a bus interface 808, a bus 802, memory 805, a processor 804, and a computer-readable medium 806. Furthermore, the scheduled entity 800 may include a user interface 812 and a transceiver 810 substantially similar to those described above in FIG. 7. That is, the processor 804, as utilized in a scheduled entity 800, may be used to implement any one or more of the processes described below and illustrated in FIGS. 9-12.

In some aspects of the disclosure, the processor 804 may include circuitry configured for various functions, including, for example, a processing circuit 840, a DL communication circuit 842, and a UL communication circuit 844.

The processing circuit 840 may be configured to perform various data processing functions and communication resources allocation and scheduling. In one example, the processing circuit 840 may be configured to implement various protocol entities including a PHY entity, a MAC entity, an RLC entity, a PDCP entity, and an SDAP entity. The UL communication circuit 844 may be configured to perform various UL communication functions, for example, encoding, ciphering, multiplexing, and transmitting. The DL communication circuit 842 may be configured to perform various DL communication functions, for example, decoding, deciphering, demultiplexing, and receiving. For example, the circuitry may be configured to implement one or more of the functions described in relation to FIGS. 9-12.

In one or more examples, the computer-readable storage medium 806 may include software configured for various functions, including, for example, processing instructions 852, DL communication instructions 854, and UL communication instructions 856. The processing instructions 852 may perform various data processing functions and communication resources allocation and scheduling. The UL communication instructions 856 may perform various UL communication functions, for example, encoding, ciphering, multiplexing, and transmitting. The DL communication instructions 854 may perform various DL communication functions, for example, decoding, deciphering, demultiplexing, and receiving. For example, the software may be configured to implement one or more of the functions described in relation to FIGS. 9-12.

Figure 9:
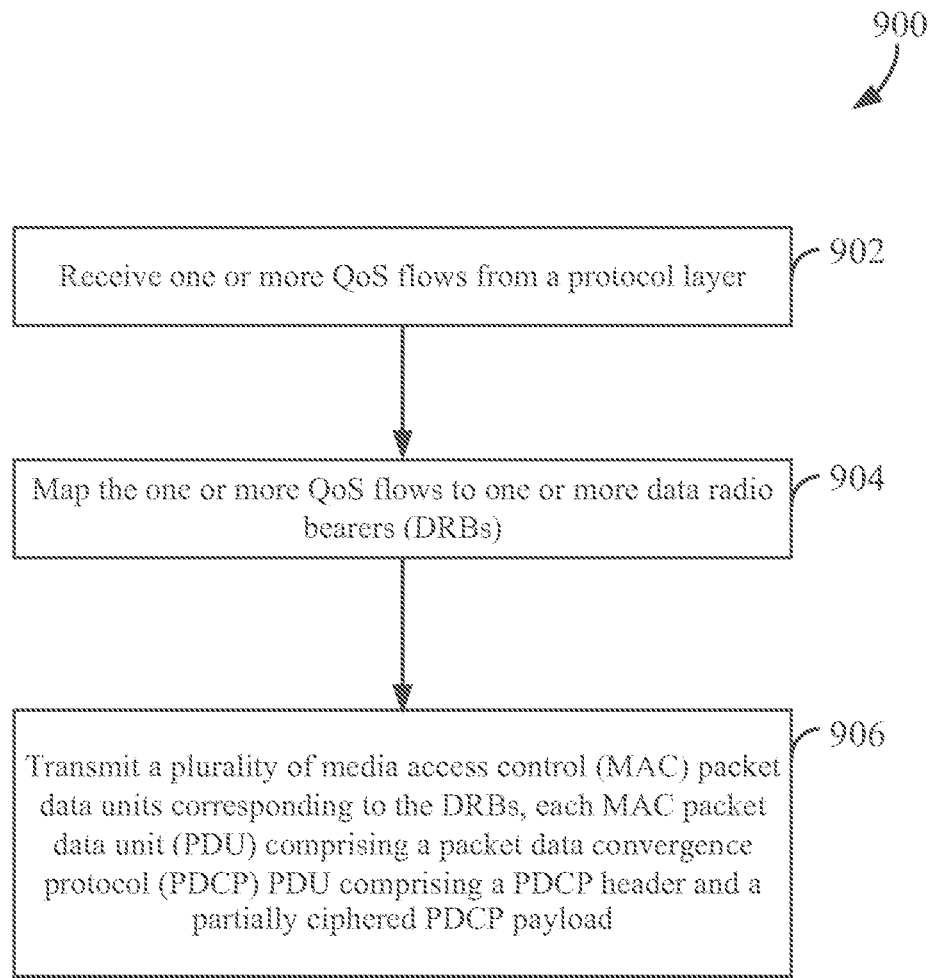
FIG. 9 is a flow chart illustrating an exemplary process for wireless communication at a transmitting device using a packet structure with an unciphered service data adaptation protocol (SDAP) header according to some aspects of the present disclosure.

FIG. 9 is a flow chart illustrating an exemplary process 900 for wireless communication at a transmitting device using a packet structure with an unciphered SDAP header in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the scheduling entity 700 illustrated in FIG. 7. In some examples, the process 900 may be carried out by the scheduled entity 800 illustrated in FIG. 8. In some examples, the process 900 may be carried out by any suitable apparatus or means for carrying out the functions or algorithm described below.

At block 902, the transmitting device may receive one or more QoS flows from an application layer or IP layer that has data for transmission. In one aspect of the disclosure, an application layer or IP layer at the scheduling entity 108 or scheduled entity 106 may transmit one or more QoS flows to the transmitting device. For example, the apparatus may utilize the processing circuit 740 (see FIG. 7) to implement an SDAP layer entity that receives the QoS flows. The QoS flows may have different levels of priority and/or latency requirement. For example, a QoS flow having a higher priority may have be allocated more time and/or frequency resources.

At block 904, the transmitting device may map the one or more QoS flows to one or more data radio bearers (DRBs) established between the transmitting device and a receiving device. In one example, the transmitting device may be a scheduling entity (e.g., gNB), and the receiving device may be a scheduled entity (e.g., UE). In one example, the transmitting device may utilize the SDAP layer entity to map the one or more QoS flows to one or more DRBs.

At block 906, the transmitting device may transmit a plurality of MAC protocol data units corresponding to the DRBs. Each MAC PDU includes a PDCP PDU including a PDCP header and a partially ciphered PDCP payload. In one aspect of the disclosure, the PDCP payload may be the same as the PDCP payload 618 shown in FIG. 6. For example, the PDCP payload may include an SDAP header and an SDAP payload (e.g., IP payload). The PDCP payload may be partially ciphered. For example, the SDAP header is not ciphered, while the SDAP payload is ciphered. In one example, the transmitting device may read the SDAP header from the partially ciphered PDCP payload to obtain prioritization information of the SDAP payload and prioritize transmission of the plurality of MAC PDUs based on the prioritization information. In one example, the SDAP header indicates a QoS level needed for the packet, and the QoS level may be used to select a priority between packets for transmission. Similarly, the device may use the SDAP header of received packets for prioritizing the reception across packets and forwarding to the host.

Figure 10:
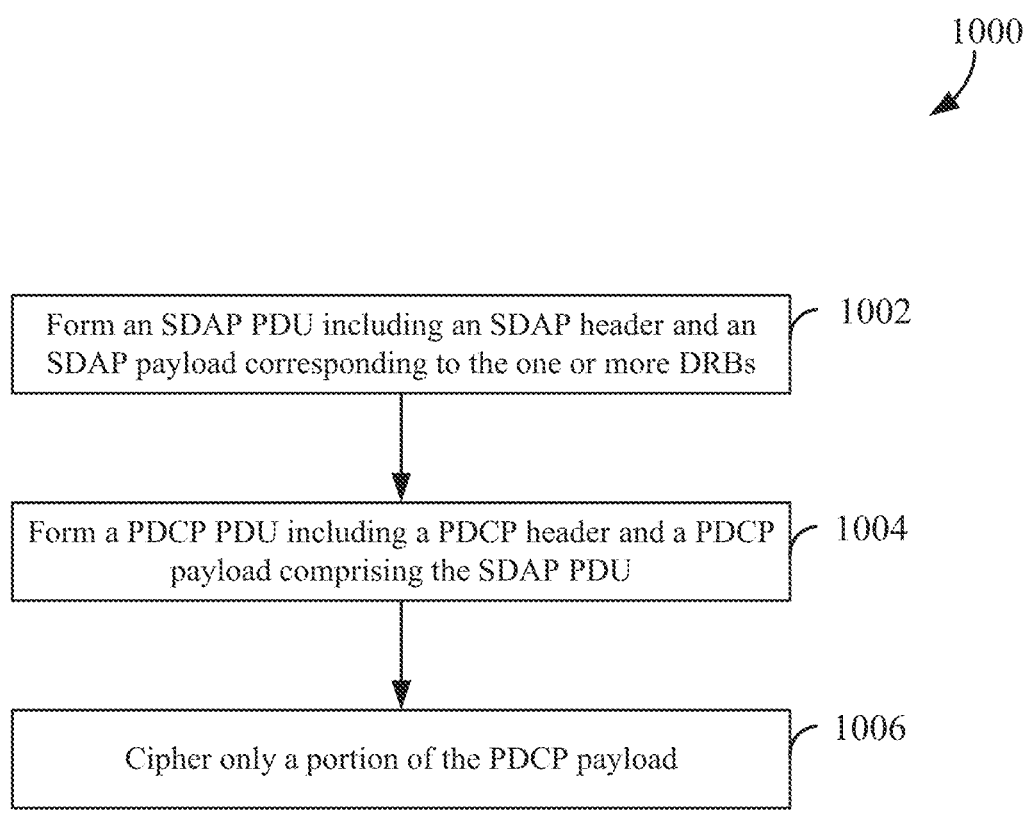
FIG. 10 is a flow chart illustrating an exemplary process for forming a MAC PDU with an unciphered SDAP header according to some aspects of the present disclosure.

FIG. 10 is a flow chart illustrating an exemplary process 1000 for forming a MAC PDU with an unciphered SDAP header in accordance with some aspects of the present disclosure. In some examples, the process 1000 may be carried out by the scheduling entity 700 illustrated in FIG. 7. In some examples, the process 1000 may be carried out by the scheduled entity 800 illustrated in FIG. 8. In some examples, the process 1000 may be carried out by any suitable apparatus or means for carrying out the functions or algorithm described below.

At block 1002, a transmitting device may utilize an SDAP entity to form an SDAP PDU including an SDAP header and an SDAP payload (e.g., IP payload) corresponding to one or more DRBs. The SDAP header may include information of the DRBs, for example, QFI and RQI of the QoS flows described above in relation to FIGS. 5 and 6. At block 1004, the transmitting device may form a PDCP PDU including a PDCP header and a PDCP payload that includes the SDAP PDU. The device may utilize the processing circuit 740 to implement a PDCP entity that forms the PDCP PDU.

At block 1004, the transmitting device may utilize the PDCP entity to cipher only a portion of the PDCP payload. That is, the PDCP payload is partially ciphered. In one example, the PDCP entity may cipher only the SDAP payload but not the SDAP header. In one aspect of the disclosure, the transmitting device may form a MAC PDU by adding an RLC header and a MAC header to encapsulate the PDCP PDU. Then the transmitting device may use the DL communication circuit 744 or UL communication circuit 844 to transmit the MAC PDU to a receiving device.

The above-described processes may be performed by a scheduling entity or a scheduled entity. When the processes are performed by the scheduling entity, the transmission may be a DL communication. When the processes are performed by the scheduled entity, the transmission may be an UL communication.

Figure 11:
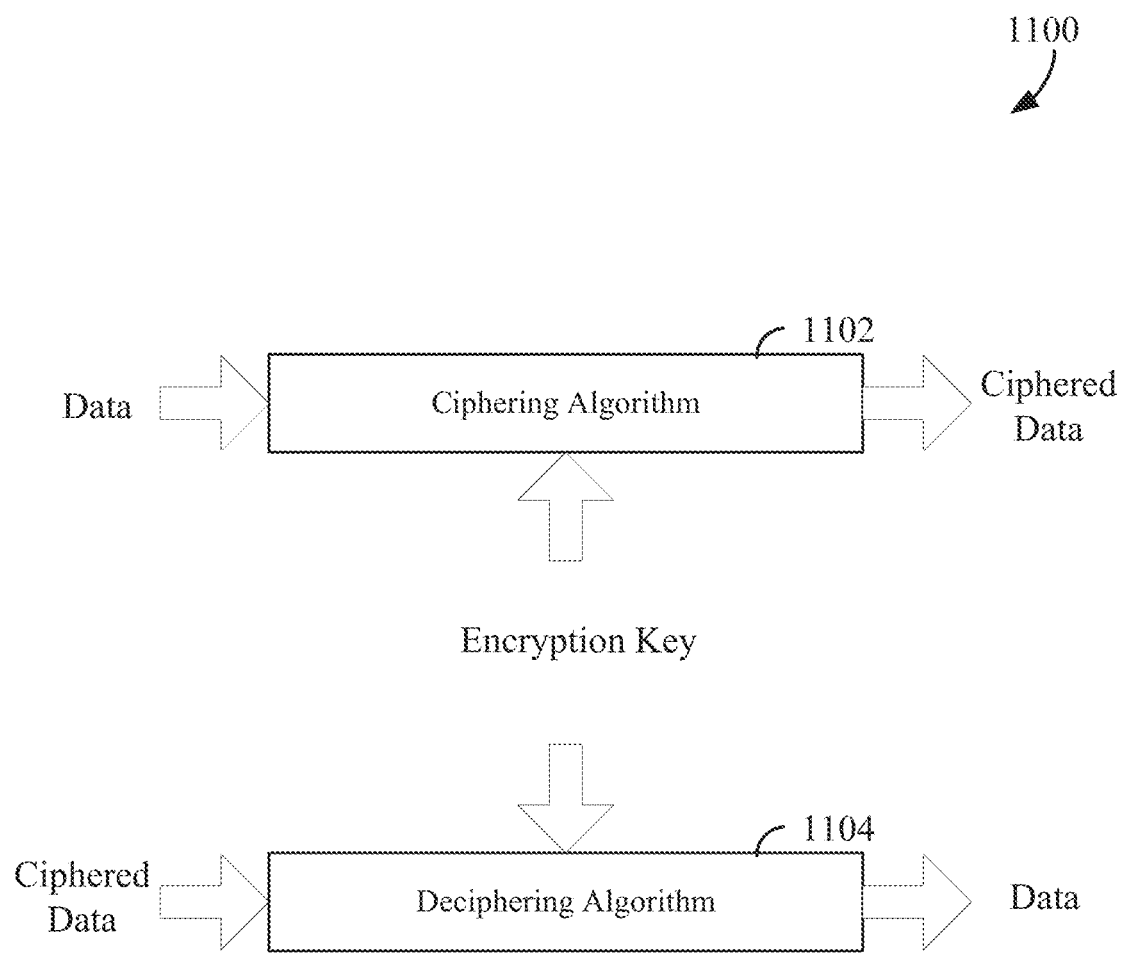
FIG. 11 is a diagram illustrating a ciphering process and a deciphering process according to some aspects of the disclosure.

Referring to FIG. 11, ciphering is a process of altering information (data) to prevent it from an unauthorized recipient. Ciphering involves the use of a data processing algorithm 1102 (ciphering or encryption algorithm) that uses one or more secret or encryption keys that both the sender and receiver use to encrypt and decrypt the information. Deciphering involves the use of a data processing algorithm 1104 to decrypt the data using the encryption key. In some aspects of the disclosure, user plane data is ciphered at the PDCP layer to securely deliver IP packets in the user plane through DRB(s) over radio links.

When the SDAP header is not ciphered, certain optimizations may be implemented in the communication processes. For example, when a transmitting device (e.g., UE) has uplink data for transmission, the transmitting device needs to decide on the amount of data for each logical channel to be included in a MAC PDU. When the transmitting device performs logical channel prioritization to prioritize the data packets of different QoS flows, the MAC entity at the transmitting device may read the unciphered SDAP header to facilitate further prioritization of data even within one logical channel. However, if the SDAP header is ciphered, then the MAC layer entity is blind to this information, and the transmitting device cannot use such information for further data prioritization.

At the receiving side, when a device receives a MAC PDU, it removes or decodes all the headers (e.g., MAC header, RLC header, PDCP header, and SDAP header) and deciphers the SDAP header if the SDAP header is ciphered by the transmitting device. However, if the SDAP header is not ciphered (unciphered), the receiving device can read the content of the SDAP header before deciphering the entire SDAP payload. As a result, the receiving device can perform certain pre-processing beforehand, which increases the processing efficiency of the receiving device. For example, the receiving device may determine the RQI information such that the receiving device can set up the QoS-to-DRB mapping for the UL before completing the deciphering of the SDAP payload.

Figure 12:
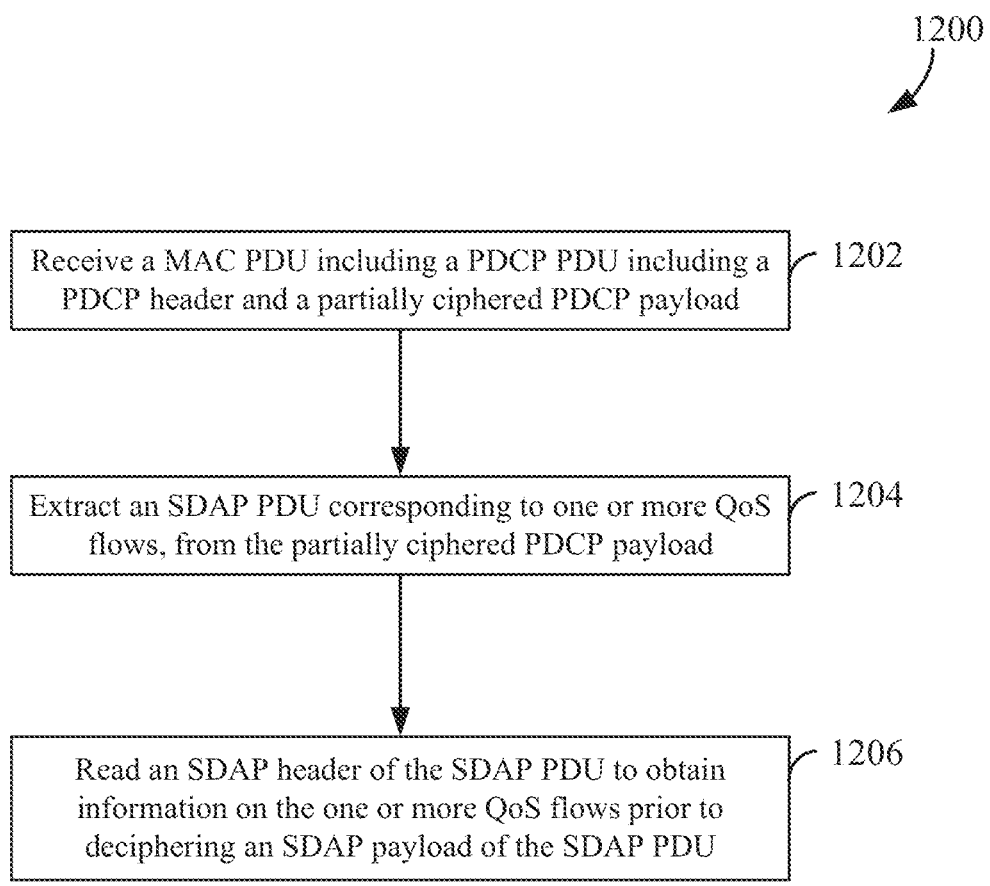
FIG. 12 is a flow chart illustrating an exemplary process for wireless communication at a receiving device using a packet structure with an unciphered SDAP header according to some aspects of the present disclosure.

FIG. 12 is a flow chart illustrating an exemplary process 1200 for wireless communication at a receiving device using a packet structure with an unciphered SDAP header in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduling entity 700 illustrated in FIG. 7. In some examples, the process 1200 may be carried out by the scheduled entity 800 illustrated in FIG. 8. In some examples, the process 1200 may be carried out by any suitable apparatus or means for carrying out the functions or algorithm described below.

At block 1202, the receiving device may receive a MAC PDU including a PDCP PDU that includes a PDCP header and a partially ciphered PDCP payload. In one example, the receiving device (e.g., a scheduling entity 700) may utilize an UL communication circuit 742 to implement a MAC entity that receives the MAC PDU. In another example, the receiving device (e.g., a scheduled entity 800) may utilize a DL communication circuit 842 to implement a MAC entity that receives the MAC PDU.

At block 1204, the receiving device may extract an SDAP PDU corresponding to one or more QoS flows from the partially ciphered PDCP payload (e.g., PDCP payload 618 of FIG. 6). A partially ciphered PDCP payload includes at least one data field that is not ciphered. For example, the partially ciphered PDCP payload includes the SDAP PDU that includes an unciphered SDAP header and a ciphered SDAP payload. For example, the receiving device may utilize the processing circuit 740/840 to implement various protocol entities to decode, extract, and/or decipher the MAC header, RLC header, PDCP header, SDAP header, and SDAP payload of the MAC PDU.

At block 1206, the receiving device may read the SDAP header to obtain information on the one or more QoS flows prior to deciphering the SDAP payload of the SDAP PDU. For example, the receiving device may utilize the processing circuit 740/840 to read information from the unciphered SDAP header. Because the SDAP header is not ciphered, the receiving device can read the information (e.g., QCF and RQI) before or while deciphering the SDAP payload. For example, the receiving device may determine a reflective QoS indicator (RQI) from the obtained information, and set up a mapping, based on the RQI, between a QoS flow and a DRB for an UL transmission prior to completing the deciphering of the SDAP payload (e.g., IP payload).

In one configuration, the apparatus 700 and/or 800 for wireless communication includes means for performing the various functions and processes described above. In one aspect, the aforementioned means may be the processor(s) 704/804 shown in FIG. 7/8 configured to perform the functions recited by the aforementioned means. In another aspect, the aforementioned means may be a circuit or any apparatus configured to perform the functions recited by the aforementioned means.

Of course, in the above examples, the circuitry included in the processor 704/804 is merely provided as an example, and other means for carrying out the described functions may be included within various aspects of the present disclosure, including but not limited to the instructions stored in the computer-readable storage medium 706/806, or any other suitable apparatus or means described in any one of the FIGS. 1, 2, 4, and/or 5, and utilizing, for example, the processes and/or algorithms described herein in relation to FIGS. 9-12.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a transmitting device, comprising:
   receiving one or more quality of service (QoS) flows from a protocol layer;
   mapping the one or more QoS flows to one or more data radio bearers (DRBs) established between the transmitting device and a receiving device; and
   transmitting a plurality of media access control (MAC) protocol data units (PDUs) corresponding to the one or more DRBs, each MAC protocol data unit (PDU) comprising:
      a packet data convergence protocol (PDCP) PDU comprising a PDCP header preceding an unciphered header of a partially ciphered PDCP payload,
      wherein the unciphered header includes a reflective QoS indicator (RQI) that provides a basis for setting up a mapping between a QoS flow and a DRB for an uplink (UL) transmission prior to completing a deciphering of the partially ciphered PDCP payload.

2. The method of claim 1, wherein the PDCP payload comprises:
   a service data adaptation protocol (SDAP) PDU comprising an SDAP header and an SDAP payload corresponding to the one or more DRBs, wherein the SDAP header is not ciphered.

3. The method of claim 2, wherein the SDAP payload is ciphered.

4. The method of claim 2, wherein the transmitting comprises:
   reading the SDAP header from the partially ciphered PDCP payload to obtain prioritization information of the SDAP payload; and
   prioritizing transmission of the plurality of MAC PDUs based on the prioritization information.

5. The method of claim 4, wherein the prioritizing comprises:
   prioritizing transmission of the MAC PDUs of a same logical channel based on the prioritization information of the SDAP payload in each MAC PDU.

6. The method of claim 1, further comprising:
   receiving a second MAC PDU comprising a second PDCP PDU comprising a PDCP header preceding an unciphered header of a partially ciphered PDCP payload;
   extracting a second SDAP PDU corresponding to one or more second QoS flows, from the partially ciphered PDCP payload of the second PDCP PDU; and
   reading an SDAP header of the second SDAP PDU to obtain information on the one or more second QoS flows prior to deciphering an SDAP payload of the second SDAP PDU.

7. The method of claim 6, wherein the SDAP payload comprises an Internet protocol payload.

8. A method of wireless communication at a receiving device, comprising:
   receiving a media access control (MAC) protocol data unit (PDU) comprising a packet data convergence protocol (PDCP) PDU comprising a PDCP header and a partially ciphered PDCP payload;
   extracting a service data adaptation protocol (SDAP) PDU corresponding to one or more quality of service (QoS) flows, from the partially ciphered PDCP payload;
   reading an SDAP header of the SDAP PDU to obtain information on the one or more QoS flows prior to deciphering an SDAP payload of the SDAP PDU;
   determining a reflective QoS indicator (RQI) from the obtained information; and
   setting up a mapping, based on the RQI, between a QoS flow and a data radio bearer (DRB) for an uplink (UL) transmission prior to completing the deciphering of the SDAP payload.

9. The method of claim 8, wherein the extracting the SDAP PDU comprises:
   deciphering the SDAP payload while not deciphering the SDAP header.

10. The method of claim 8, wherein the SDAP payload comprises an Internet protocol payload.

11. An apparatus for wireless communication, comprising:
    a memory storing executable code;
    a transceiver configured for wireless communication; and
    a processor communicatively coupled with the memory and the transceiver,
    wherein the processor and the memory are configured to:
       receive a media access control (MAC) protocol data unit (PDU) comprising a packet data convergence protocol (PDCP) PDU comprising a PDCP header and a partially ciphered PDCP payload;
       extract a service data adaptation protocol (SDAP) PDU corresponding to one or more quality of service (QoS) flows from the partially ciphered PDCP payload;
       read an SDAP header of the SDAP PDU to obtain information on the one or more QoS flows prior to deciphering an SDAP payload of the SDAP PDU;
       determine a reflective QoS indicator (RQI) from the obtained information; and
       set up a mapping, based on the RQI, between a QoS flow and a data radio bearer (DRB) for an uplink (UL) transmission prior to completing the deciphering of the SDAP payload.

12. The apparatus of claim 11, wherein the processor and the memory are further configured to:

decipher the SDAP payload while not deciphering the SDAP header.

13. The apparatus of claim 11, wherein the SDAP payload comprises an Internet protocol payload.

\* \* \* \* \*